No. 702,915. Patented June 24, 1902.
C. BÖCKER.
APPARATUS FOR COOLING OR HEATING BEVERAGES.
(Application filed May 13, 1901.)
(No Model.)
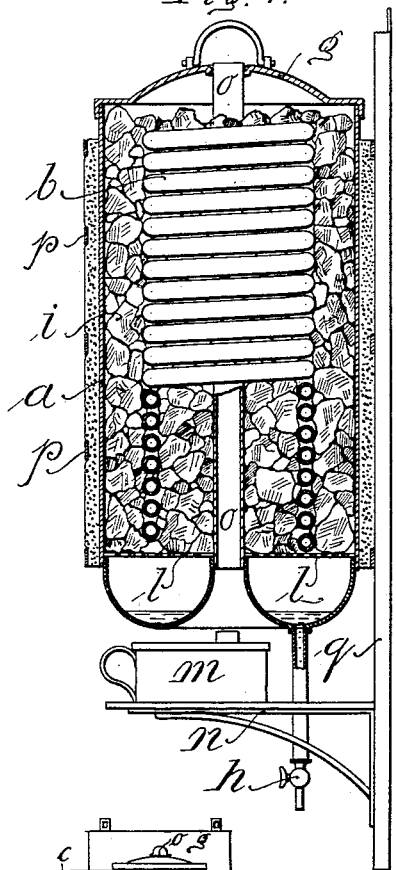
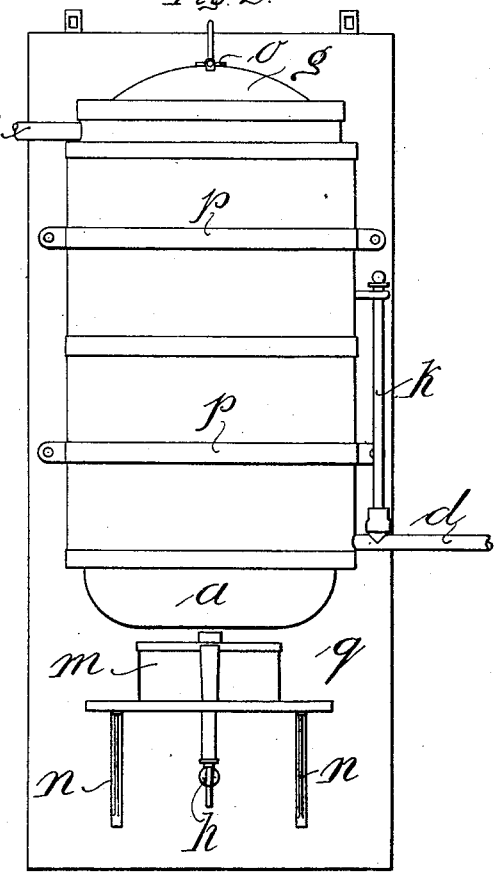
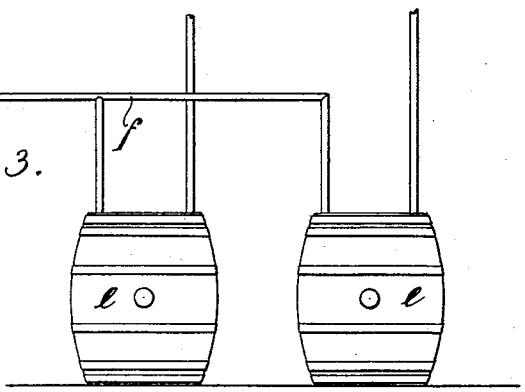
Witnesses:
T. D'Arcy McMahon.
R. L. Howland.
Inventor,
Carl Böcker
by B. Singer Att'y.

UNITED STATES PATENT OFFICE.

CARL BÖCKER, OF ALTONA-OTTENSEN, GERMANY.

APPARATUS FOR COOLING OR HEATING BEVERAGES.

SPECIFICATION forming part of Letters Patent No. 702,915, dated June 24, 1902.

Application filed May 13, 1901. Serial No. 60,051. (No model.)

*To all whom it may concern:*

Be it known that I, CARL BÖCKER, innkeeper, of 37 Isebeckstrasse, Altona-Ottensen, in the Empire of Germany, have invented new and useful Improvements Relating to Apparatus for Cooling or Heating Beverages, (for which patent applications are made in Germany, filed March 12, 1901; in Austria, filed March 27, 1901, and in Great Britain, filed April 26, 1901,) of which the following is a specification.

This invention relates to improved apparatus serving to maintain beverages, more esspecially beer, at a temperature suited to the time of year. Hitherto it has been customary to cool beer in summer by causing a stream of cold water to pass over the conduit containing it or by keeping pieces of ice on the beer-barrel. In winter the method has been to warm the beer by the introduction of vessels filled with hot water or of heated metal bars. Of these two methods of cooling and heating the liquid, respectively, the first is too costly, owing to the consumption of ice, while the second is too troublesome, especially for large businesses; but both methods present the defect that the compressed air serving to deliver the beer is too hot in summer and too cold in winter, so that it exerts a prejudicial effect upon the beer.

The object of this invention is to obviate these defects by cooling or warming the compressed air only.

In order that my invention may be readily understood and carried into effect, I will describe the same fully with reference to the accompanying drawings, in which—

Figure 1 is a vertical section through my improved apparatus. Fig. 2 is a front elevation of the same, and Fig. 3 represents, upon a smaller scale, a complete installation.

Within a cylindrical vessel $a$, provided with a covering of insulating material, is arranged a tubular coil $b$, the projecting extremity $c$ of which is connected with the pressure-cylinder, (not shown,) while the extremity $d$ is connected with the conduit $f$, leading to the beer-barrels $e$. The upper portion of the vessel $a$ is closed by means of a cover $g$, and at its lower portion it is provided with a draw-off cock $h$. The space around the coil in the vessel $a$ is filled with pieces of ice $i$, so that the compressed air passing through the coil is cooled, a thermometer $k$ being provided upon the tube $d$, upon which the temperature may be read. A sieve $l$, arranged at the lower portion of the vessel $a$, prevents pieces of ice from reaching the cock $h$. If, on the other hand, it is desired to warm the compressed air, and consequently the beer, with this same apparatus, the vessel $a$ is filled with hot water. If, however, a supply of hot water is not available, the water in the vessel $a$ may be heated by means of a spirit-lamp $m$, which may conveniently be placed upon a bracket $n$, arranged upon the apparatus beneath the central flue $o$, which extends through the cover of the vessel $a$. As the air remaining constantly in contact with the upper surface of the beverage to be delivered may be maintained at a suitable temperature, there is the surest guarantee that the beverage itself will remain at a constant temperature, also, whether it is consumed quickly or slowly. The whole of the apparatus is securely fastened to the wall or other support $q$ by means of flat iron bands $p$.

What I do claim as my invention, and desire to secure by Letters Patent, is—

In an apparatus for the purpose described, the combination of a tank having its side walls formed of non-heat-conducting material, a flue or tube extending from an aperture in the bottom of the tank to points above the upper edge of the tank, a conduit for the fluid to be treated arranged in the form of a coil about said flue and having its ends extending through the walls of the tank, a perforated partition arranged within the tank below said coil, a waste-pipe communicating with the tank, below said partition, and a removable cover closing the upper end of the tank about said flue.

In testimony whereof I affix my signature in presence of two witnesses.

CARL BÖCKER.

Witnesses:
 E. H. L. MUMMENHOFF,
 OTTO W. HELLMRICH.